United States Patent
Moya et al.

(10) Patent No.: US 12,215,056 B2
(45) Date of Patent: Feb. 4, 2025

(54) ADDITIVES OF GRAPHENE NANOMATERIALS FOR THE IMPROVEMENT OF CEMENTITIOUS COMPOSITIONS, CEMENTITIOUS COMPOSITION, A PROCESS FOR PREPARING A REINFORCED CONCRETE, A REINFORCED CONCRETE AND ITS USE

(71) Applicants: Graphenano S.L., Yecla (ES); Juan Angel Ruiz Moya, Bullas (ES)

(72) Inventors: Juan Angel Ruiz Moya, Bullas (ES); Amaya Romero Izquierdo, Yecla (ES); Maria del Prado Lavin Lopez, Yecla (ES)

(73) Assignees: Graphenano S.L., Yecla (ES); Juan Angel Ruiz Moya, Bullas (ES)

( * ) Notice: Subject to any disclaimer, the term of this patent is extended or adjusted under 35 U.S.C. 154(b) by 844 days.

(21) Appl. No.: 17/285,931

(22) PCT Filed: Oct. 16, 2019

(86) PCT No.: PCT/EP2019/000295
§ 371 (c)(1),
(2) Date: Apr. 16, 2021

(87) PCT Pub. No.: WO2020/078578
PCT Pub. Date: Apr. 23, 2020

(65) Prior Publication Data
US 2021/0347693 A1 Nov. 11, 2021

(30) Foreign Application Priority Data
Oct. 16, 2018 (EP) .................................... 18382738

(51) Int. Cl.
C04B 14/02 (2006.01)
C04B 28/02 (2006.01)
(Continued)

(52) U.S. Cl.
CPC ............ *C04B 14/026* (2013.01); *C04B 28/02* (2013.01); *C04B 40/0039* (2013.01); *B82Y 30/00* (2013.01); *B82Y 40/00* (2013.01); *C04B 2111/28* (2013.01)

(58) Field of Classification Search
CPC ....... B82Y 30/00; B82Y 40/00; C04B 14/024; C04B 14/026; C04B 14/06; C04B 14/386;
(Continued)

(56) References Cited

U.S. PATENT DOCUMENTS

| 8,951,343 B2 | 2/2015 | Sadiq et al. |
| 2015/0240047 A1 | 8/2015 | Korzhenko et al. |

FOREIGN PATENT DOCUMENTS

| CN | 102924020 A | 2/2013 |
| CN | 103359997 B | 12/2014 |

OTHER PUBLICATIONS

English Machine Translation (CN 102924020B) (Year: 2012).*
(Continued)

*Primary Examiner* — Holly Rickman
*Assistant Examiner* — Linda N Chau
(74) *Attorney, Agent, or Firm* — Wood Herron & Evans LLP

(57) ABSTRACT

An additive of graphene nanomaterials for the improvement of cementitious compositions, a cementitious composition, a process for preparing a concrete a concrete and use of the concrete. The additive includes a mixture of graphene nanofibers, graphene oxide (GO), a dispersing agent (D) and a superplasticizer (SP), comprising at least two graphene nanofibers, selected among graphene nanofibers of high specific surface area (GNF-HS), graphene nanofibers of low specific surface area (GNF-LS) or graphene nanofibers of long length (GNF-LL), wherein the graphene nanofibers have an average diameter comprised between 2 nm and 200

(Continued)

nm, and wherein said additive of graphene nanomaterials by having different proportions of the at least two graphene nanofibers is fine-tuned for different cementitious compositions of particular properties.

8 Claims, 4 Drawing Sheets

(51) Int. Cl.
    *C04B 40/00*     (2006.01)
    *B82Y 30/00*     (2011.01)
    *B82Y 40/00*     (2011.01)
    *C04B 111/28*     (2006.01)

(58) Field of Classification Search
    CPC ............ C04B 20/0008; C04B 20/0052; C04B 20/006; C04B 20/008; C04B 2103/32; C04B 2111/0075; C04B 2111/26; C04B 2111/28; C04B 2111/34; C04B 24/2641; C04B 24/2647; C04B 28/02; C04B 40/0039
    See application file for complete search history.

(56) References Cited

OTHER PUBLICATIONS

European Patent Office, Search Report and Written Opinion issued in PCT/EP2019/000295 dated Feb. 28, 2020.
European Patent Office, International Preliminary Report on Patentability issued in PCT/EP2019/000295 dated Feb. 11, 2021.
Nicole Grobert, Carbon nanotubes—becoming clean, Materials Today, Jan.-Feb. 2007, vol. 10, No. 1-2, 18-35.
Liwen Ji et al, Fabrication of Carbon Fibers with Nanoporous Morphologies from Electrospun Polyacrylonitrile/Poly(L-lactide) Blends, Journal of Polymer Science: Part B: Polymer Physics, 2009, 493-503, Published online in WIley InterScience.
Chan Kim et al, Synthesis and Characterization of Porous Carbon Nanofibers with Hollow Cores Through the Thermal Treatment of Electrospun Copolymeric Nanofiber Webs, Small, 2007, vol. 3, No. 1, 91-95.
Yaodong Liu et al, Recent Process in Fabrication, Structure, and Properties of Carbon Fibers, Polymer Reviews, Sep. 4, 2012, 52:3-4, 234-258.
Ignacio Martin-Gullon et al, Differences between carbon nanofibers produced using Fe and Ni catalysts in a floating catalyst reactor, Carbon, Feb. 20, 2006, 44, 1572-1580.
Florence Sanchez et al, Nanotechnology in concrete—A review, Construction and Building Materials, May 15, 2010, 24, 2060-2071.
Anastasia Sobolkina et al, Dispersion of carbon nanotubes and its influence on the mechanical properties of the cement matrix, Cement & Concrete Composites, Aug. 8, 2012, 34, 1104-1113.
Lifeng Zhang et al, Carbon nanofibers with nanoporosity and hollow channels from binary polyacrylonitrile systems, European Polymer Journal, Oct. 10, 2008, 45, 47-56.
Yanwu Zhu et al, Graphene and Graphene Oxide: Synthesis, Properties, and Applications, Advanced Materials, 2010, 22, 3906-3924.

\* cited by examiner

ADDITIVES OF GRAPHENE NANOMATERIALS FOR THE IMPROVEMENT OF CEMENTITIOUS COMPOSITIONS, CEMENTITIOUS COMPOSITION, A PROCESS FOR PREPARING A REINFORCED CONCRETE, A REINFORCED CONCRETE AND ITS USE

FIELD OF THE ART

The present invention relates to additives based on graphene nanomaterials for the improvement of cementitious compositions, preferably concrete and in a cementitious composition incorporating the additives.

The term "cement" which is the basis of a cementitious composition used here is well known in the art and refers to a fine, soft, dry, powdery-type binder substance that when mixed with water can cure in a hard, solid mass. A cement is a substance used for construction that sets, hardens, and adheres to other materials to bind them together. Cement is usually used to bind sand and gravel (aggregate) together. Cement mixed with fine aggregate produces mortar for masonry, or with sand and gravel, produces concrete. Cements used in construction are usually inorganic, often lime or calcium silicate based. As used herein, the term "cement", is understood to include any cement which has the characteristic of hardening under water e.g., Portland cement, blends of Portland cement and natural cement, pozzolanic cements, slag cement, masonry cement, oil well cement, white Portland cement, mixtures of Portland cement and blast-furnace slag cement and like materials. In particular, the term "cementitious composition" refers to a mixture of elements such as limestone, clay, sand, and/or shale, among others.

In the context of the present invention, the term "specific surface area (SSA)" refers to the total surface area of a material per unit of mass.

The expression "compressive strength" in the context of the invention refers to the capacity of a material or structure to withstand loads tending to reduce size.

The term "graphene oxide" or "GO" refers to a monolayer of $sp^2$-hybridized carbon atoms with oxygen functional groups that may be attached to one or both sides of the monolayer. The oxygen functional groups, attached on the basal planes and edges of graphene sheets, significantly change the Van der Waals interactions between the sheets, thus improving their dispersion in water.

In the context of the present invention the term "superplasticizer" refers to polymers having dispersing properties to avoid particle segregation (gravel, coarse and fine sands), and to improve the flow characteristics (rheology) of suspensions in concrete. Moreover, the superplasticizers have the facility of reducing the water content of a cementitious composition considerably. Generally, the superplasticizer compound comprises between 10 and 30% of the polymers mentioned and the rest is water.

The term "carbonation" used here refers to the reaction of carbon dioxide in the environment with the calcium hydroxide in the cement paste. This reaction produces calcium carbonate and lowers the pH to around 9. At this value the protective oxide layer surrounding the reinforcing steel breaks down and corrosion becomes possible.

BACKGROUND

Concrete is a composite material of aggregates and binders, where binders are primarily a combination of cement, pozzolanic materials and water.

The relatively low tensile strength and ductility of the concrete are counteracted by the inclusion of reinforcements having higher tensile strength and/or ductility. In this sense, a typical reinforcement of concrete is provided using reinforcing bars and macrofibers, both of which reinforce concrete at the millimetre scale. Moreover, Sanchez and Sobolev discloses the use of polymers such as polyvinyl alcohol, polypropylene, polyethylene and polyamide to reinforce concrete [Construction and building materials, 24 (2010) 2060-2071].

Nano-reinforcements in cementitious composite materials are considered more effective than conventional steel bar/ fiber reinforcements to hinder the formation and propagation of microcracks at the outset because they can control nano-sized cracks (at the initiation stage) before they develop into micro-size cracks. However, the incorporation of nanomaterials in cement composites is a complex task and sometimes yields contrasting results.

Recently, carbon nanostructures such as carbon nanotubes (CNTs), carbon nanofibers (CNFs), and graphene have attracted the attention of researchers because of their exceptional mechanical, chemical, thermal, and electrical properties, and their good performance as polymeric reinforcement materials. However, the addition of CNTs results in little changes in the strength or results even in the deterioration of cement composites. Moreover, CNTs tend to form agglomerates or bundles difficult to separate (Groert, Materials Today 2007, 10, 28-35). A Sobolkina et al. [Cement and concrete composites, 34(2012) 1104-1113] reports that CNTs tend to agglomerate when they are dispersed in a cement matrix so that their uniform distribution in the matrix is impeded.

Moreover, non-uniformly distributed CNTs cannot form a network within a matrix to support load transfer or mitigate the development of cracks.

CN 102924020 A discloses in embodiment 3 a cementitious composition (useful in the preparation of concrete) comprising inter alia Portland cement, graphene oxide (GO), carbon nanofibers (CNF) of length 60-100 nm diameter and 6-30 μm length and a superplasticizer of naphthalene sulfonate formaldehyde condensate type.

U.S. Pat. No. 8,951,343 B2 discloses the preparation of ultra-high cementitious materials suitable for preparing e.g. pavements having increased fire resistance, flexural/tensile strength and crack resistance, the preparation comprising dispersing graphite nanomaterials such as carbon nanofibers and/or nanoplatelets, optionally oxidized, the dispersion comprising at least one of polyelectrolytes such as polyacrylic acid and water reducers.

US 2015240047 A1 discloses the preparation of building materials based on inorganic systems such as cement, including the addition of a so-called master batch which comprises a carbon-based nanofiller, a superplasticizer and a further dispersing agent, the nanofiller being selected from inter alia carbon nanofibers or an oxidized graphene.

CN 103359 997 B discloses the preparation of a reinforced concrete composition comprising a nano-sized carbon material in combination with a superplasticizer.

However, despite the efforts to date, there is still a need in the art concerning additives suitable for cementitious compositions, particularly to improve the mechanical properties, durability and fire resistance properties of reinforced cement composites.

A further objective of the invention is that all the improvements are within an economic range that will allow them to reach the market.

SUMMARY OF THE INVENTION

The purpose of the present invention is to provide an additive based on graphene nanomaterials for a cementitious composition (conglomerate or aggregate) in particular that improves the properties of the cementitious composition, not only its mechanical properties, but also its conductivity, fire-resistance and durability.

The invention is defined in the claims.

Thus, in a first aspect the invention relates to an additive for a cementitious composition or cementitious conglomerate comprising a dispersion of graphene oxide (GO), a dispersing agent (D) and a superplasticizer (SP) wherein the graphene nanofibers have an average diameter comprised between 2 nm and 200 nm.

Particularly, the dispersion of the additive of the invention in a cementitious composition or cementitious conglomerate enhances the mechanical properties of the cementitious composition and improves the material durability by delaying crack formation.

In another aspect the present invention relates to a cementitious composition comprising cement and the additive of the invention.

In another aspect the invention relates to a cement paste comprising the cementitious composition of the invention.

In another aspect the invention relates to a process for preparing a cementitious composition such as a reinforced concrete comprising mixing the cement paste of the invention with water, sand and gravel.

In another aspect the invention relates to a reinforced concrete obtainable by the process of the invention.

The reinforced concrete according to the invention will find wide applications in highway structures, bridges, pavements, runways for airports, continuous slab-type sleepers for high speed trains and in general in all applications of conventional and high strength cement composites. Thus, one final aspect of the invention relates to the use of a reinforced concrete including the improvements of this invention for highway structures, bridges, pavements, runways for airports, continuous slab-type sleepers for high-speed trains, covers of crates, and in manufactured precast elements for residential and commercial buildings.

The improvements of this inventions are related to the work of mixing the different components of the additive and achieving a final additive, in particular the invention resides in the way of mixing the two or three types of GNF nanofibers together with the graphene oxide (GO), the dispersing agent (D) and the superplasticizer (SP).

BRIEF DESCRIPTION OF THE DRAWINGS

The accompanying drawings, which are incorporated herein and constitute a part of this specification, illustrate exemplary and non-limiting embodiments of the invention and, together with the written description, serve to explain the principles of the invention. In the drawings.

DETAILED DESCRIPTION OF THE INVENTION

Figure 1:
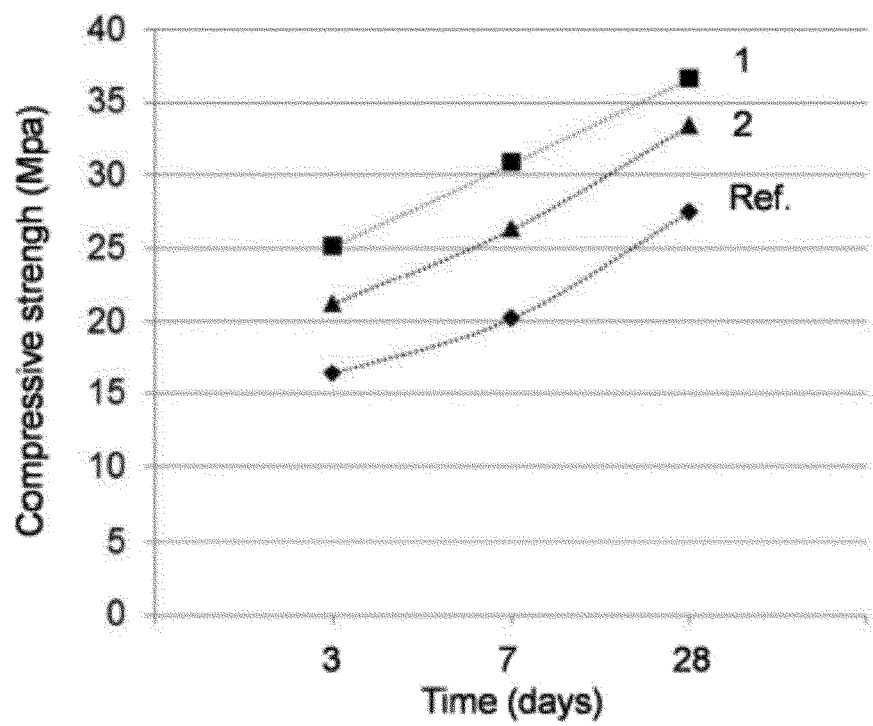
FIG. 1 shows the compressive strength variation with time for two reinforced concretes containing an additive of the invention (1 and 2) and for a reference concrete sample without the additive (Ref.).

The present invention relates to an additive for a cementitious composition comprising a dispersion of graphene nanofibers of high specific surface area (GNF-HS), graphene nanofibers of low specific surface area (GNF-LS), graphene nanofibers of long length (GNF-LL), graphene oxide (GO), a dispersing agent (D) and a superplasticizer (SP).

The graphene nanofibers have an average diameter comprised between 2 nm and 200 nm.

The graphene nanofibers of the invention are preferably characterized by a length of between 20 nm and 200 µm.

The graphene nanofibers used in the additive of the present invention are preferably selected from the group consisting of graphene nanofibers of low specific surface area (70 to 249 $m^2/g$) and length 0.02 to 2 µm, (GNF LS); graphene nanofibers of high specific surface area (250 to 400 $m^2/g$) and length 0.02 to 2 µm (GNF HS); and long-length graphene nanofibers with a specific surface area of 30 to 100 $m^2/g$ and length 5 µm to 200 µm (GNF LL); and mixtures thereof.

As per the studies of the inventors conducted in the field it has been concluded that the long-length graphene nanofibers used in the additive help in improving the mechanical properties of the cementitious composition by acting as a binder of cement microparticles while the low specific surface area and high specific surface area graphene nanofibers help with the durability and fire-resistance properties of the cementitious composition by filling in the gaps. Thus, according to this invention by varying the proportion of each type of graphene nanofiber, the additive can be fine-tuned to produce a cement of particular properties suitable for different applications. These graphene nanofibers, when combined with the graphene oxide (GO), the dispersing agent (D) and the superplasticizer (SP) in a distilled water base, result in a surprising improvement in the properties of cementitious materials which, depending on the needs of the application, can configure the additive to achieve the desired improvements.

The additive of the invention for a cementitious composition comprises a dispersion of different graphene nanofibers. Graphene nanofibers suitable for the additive of the invention contain interconnected graphene sheets wherein the long range covalent crystalline nature of the graphene eliminates the grain boundaries between the crystallites forming the structure. In the context of the present invention, graphene nanofibers are cylindrical nanostructures with graphene layers arranged as stacked cones, cups or plates.

In particular graphene nanofibers suitable for the additive of the invention can be classified depending on the angle of the graphene layers that compose the fiber with respect to the fiber axis, thus for example in stacked graphene nanofibers the graphene layers are stacked perpendicular to the fiber axis, whereas in herringbone and cup-stacked graphene nanofibers, the graphene layers are stacked at an angle between parallel and perpendicular to the fiber axis.

Moreover, the graphene nanofibers may have voids in their structure, such as micropores in the stem of the graphene nanofibers. In a particular embodiment, the graphene nanofibers have internal micropores in their structure, preferably the graphene nanofibers used in the compositions of the invention present a pore volume comprised between 0.3 and 1.6 cm$^3$/g, preferably between 0.5 and 1.5 cm$^3$/g, even more preferably between 0.8 and 1.2 cm$^3$/g.

In particular, the specific surface area of the micropores of the low specific surface area graphene nanofibers (GNF LS) of the additive of the invention is comprised between 2 and 50 m$^2$/g, preferably between 2 and 20 m$^2$/g with respect to the total surface of the graphene nanofiber.

However, unlike carbon nanotubes the graphene nanofibers of the additive of the invention are not tubular and thus, lack an internal cavity throughout the length of their structure which includes openings at both ends. In a particular embodiment, the graphene nanofibers of the additive of the invention have at least one internal void, preferably the internal void is open in only one of the two ends of the graphene nanofiber.

Moreover, unlike carbon nanofibers which have a disordered crystalline structure, graphene nanofibers present a crystalline structure wherein the carbon atoms are arranged in an ordered way.

Failure or breakage in cement-based materials is a gradual multi-scale process. When loaded, initially short and discontinuous microcracks are created in a distributed manner. These microcracks coalesce to form large macroscopic cracks, known as macrocracks. Carbon fibers bridge cracks and transfer the load, delaying the coalescence of cracks. Due to the multi-scale nature of fracture, the influence of fibers in reinforcing cement-based materials, mainly depends on the scale of reinforcement. Macrofibers can improve post-peak toughness by bridging macrocracks. Fine microfibers, on the other hand, bridge the microcracks which delay the process by which the microcracks coalesce to form macrocracks. However, cracks in cement-based materials initiate from the nanoscale where microfibers are not effective. Thus, the development of fibers at the nanoscale has opened a new field of research within concrete.

Graphene nanofibers are very effective reinforcements in cement composites. This is because they possess excellent material properties such as high stiffness, tensile strength, excellent electrical, and thermal conductivities and corrosion resistance. Moreover, the physical configuration of GNFs presents a number of exposed edges along the surface, which may establish p areas of interactions with hydration products of cements. In addition, they are more economical than Carbon nanotubes (CNTs) at industrial level.

Graphene nanofibers suitable for the additive of the invention can be acquired as of today from commercial providers (Pyrograph Products, Graphenano S.L., Polytech & Net GmbH, Suzhou Tanfeng Graphene Technology Co. LTD, NXTGEN Nanofiber).

Moreover, graphene nanofibers suitable for the additive of the present invention can be prepared by methods well-known in the art, such as by arc discharge, laser vaporization and high-pressure carbon monoxide process. Preferably, graphene nanofibers suitable for the present invention are prepared by growing from the catalytic decomposition of hydrocarbons over metal catalyst by Chemical Vapor Deposition (CVD).

The Chemical Vapor Deposition method for carbon nanofiber is a catalytic method in which a carbonaceous source is decomposed in the presence of a catalyst to grown GNFs. Transition metal catalytic particles such as iron, nickel, cobalt, and copper are used as catalyst. CVD process takes place at temperatures ranging between 500 to 200° C. [Martin-Gullon, I., et al., Differences between carbon nanofibers produced using Fe and Ni catalysts in a floating catalyst reactor. Carbon, 2006. 44(8): p. 1572-1580]. Other suitable techniques for producing graphene nanofibers include electrochemical anodization, freeze drying, sol-gel chemistry, self-assembly, three-dimensional (3-D) printing, and atomic layer deposition. Most of these methods are based upon templating and phase separation, typically combined with dissolution/extraction, etching, and high-temperature calcination or pyrolysis to generate pores via selective removal of the sacrificial component(s).

Electrospinning is an alternative production method of GNFs. Electrospinning is a simple and known process for fabricating graphene nanofibers suitable for reinforced concrete of the invention [Yaodong Liu & Satish Kumar (2012), Polymer Reviews, 52:3-4, 234-258]. A typical electrospinning setup consists of a metallic spinneret, a syringe pump, a high-voltage power supply, and a grounded collector in a humidity-controlled chamber. A polymer solution, polymer melt, or a sol-gel solution is continuously pumped through the spinneret at a constant rate, while a high-voltage gradient is applied between the spinneret tip and the collector substrate. The solvent continuously and rapidly evaporates while the jet stream is whipped and stretched by electrostatic repulsion forming solidified continuous nanofibers (diameters 20-500 nm) on the grounded collector. Graphene nanofibers are fabricated by subjecting electrospun nanofibers of an appropriate polymer precursor to stabilization and carbonization processes. Cellulose phenolicresins, polyacrylonitrile (PAN), polybenzimidazol, and pitch-based materials may be used as a polymer precursor to produce graphene nanofibers. A number of methods have been developed for generating pores in individual electrospun nanofibers, and they can be broadly divided into two strategies: i) employment of a proper post treatment (e.g., solvent extraction and calcination) and ii) manipulation of polymer-solvent phase separation. In general, the method based upon selective removal of a sacrificial component is the most straightforward and versatile route to generating porous nanofibers. Ji et al. [Journal of Polymer Science Part B: Polymer Phys. 47 (2009) 493-503] report porous carbon nanofibers prepared by carbonizing electrospun PAN/poly(L-lactide) nanofibers. The reported graphene nanofibers present irregular thin long interior pores and a specific surface area of 359 m$^2$/g. Zhang and Hsieh [L. Zhang et al., European Polymer Journal 45 (2009) 47-56] electrospun binary solutions of PAN with three different sacrificial polymers, poly (ethylene oxide), cellulose acetate, and poly(methylmethacrylate) (PMMA). Upon removal of the second polymer and subsequent carbonization, different features such as grooved, hollow, U-shaped, or collapsed fibers were observed. Similarly, Kim et al. reported porous CNFs with hollow cores obtained by electrospinning PAN and PMMA [C. Kim et al., Small, 3

(2007) 91-95; Wahab, Izzati Fatimah, et al., Advances in Carbon Nanostructures. InTech, 2016].

The preferred graphene nanofibers of the additive of the invention have an average diameter comprised between 2 nm and 200 nm, preferably between 5 nm and 160 nm. In a preferred embodiment, the graphene nanofibers have a diameter comprised between 7 and 155 nm, preferably between 10 and 150 nm, more preferably between 20 and 140 nm, more preferably between 30 and 130 nm, more preferably between 40 and 120 nm, more preferably between 50 and 110 nm, more preferably between 60 and 100 nm, more preferably between 70 and 90 nm, more preferably about 80 nm.

The average diameters and lengths of the material comprising graphene are measured by Transmission Electron Microscopy (TEM).

In a particular embodiment the graphene nanofibers of the additive of the invention having a diameter comprised between 2 nm and 200 nm, further have a length of between 20 nm and 200 μm, preferably between 20 nm and 1 μm, preferably between 30 nm and 500 nm, preferably between 50 nm and 300 nm, preferably between 75 nm and 200 nm, preferably between 100 and 150 nm.

In a particular embodiment, between 50 and 75% by weight of the graphene nanofibers of the additive of the invention have a length of between 5 μm and 200 μm, preferably between 10 and 100 μm, more preferably between 15 and 85 μm, more preferably between 20 and 75 μm, more preferably between 30 and 65 μm, more preferably between 35 and 60 μm, more preferably between 40 and 55 μm, even more preferably between 45 and 50 μm.

In a preferred embodiment, between 55 and 70% of the graphene nanofibers of the cementitious composition have a length of between 5 and 200 μm, even more preferably between 60 and 65% of the graphene nanofibers.

In a preferred embodiment the additive of the invention contains graphene nanofibers having a length between 5 and 200 μm and a diameter between 10 and 100 nm, preferably between 20 and 75 nm, even more preferably about 50 nm. Typically, these graphene nanofibers having a length of between 5 μm and 200 μm have a specific surface area of between 30 and 100 m$^2$/g.

The inventors have found that the additive of the invention containing graphene nanofibers having a length between 5 and 200 μm is more prone to interact with the cementitious composition, so that the overall properties of the cement result improved.

The inventors have seen that the cementitious compositions containing the additive of the invention wherein between 10 and 50% by weight of graphene nanofibers have an average specific surface area of between 70 and 249 m$^2$/g, have an increased compressive strength.

Thus, in a particular embodiment between 10 and 75% by weight of the graphene nanofibers of the additive of the invention have an average specific surface area of between 70 and 249 m$^2$/g, preferably between 80 m$^2$/g and 200 m$^2$/g, more preferably between 90 and 150 m$^2$/g, even more preferably between 100 and 125 m$^2$/g, even more preferably about 115 m$^2$/g. In a preferred embodiment of the latter, between 10% and 50%, more preferably between 10% and 35%, even more preferably between 15% and 35% by weight of the graphene nanofibers of the additive have an average specific surface area of between 70 and 249 m$^2$/g. In yet another embodiment, between 30 and 45% by weight of the graphene nanofibers of the additive have an average specific surface area of between 70 and 249 m$^2$/g, more preferably between 35% and 40% by weight of the graphene nanofibers.

FIG. 1 of the present application shows the resulting change of the compressive strength of concretes reinforced with an additive of the invention with time, measured according to UNE-EN 12350-2:2009. In particular concrete 1 containing 25% by weight of graphene nanofibers of the additive of the invention having an average specific surface area of between 70 and 250 m$^2$/g, exhibits higher compressive strength than the mixtures containing the additive with graphene fibers of higher specific surface area. Thus, while the exemplary concrete 1 presents a compressive strength of 25.1 MPa after 3 days and 36.6 MPa after 28 days, the reference concrete sample without additive present a compressive strength of 16.4 MPa after three days and 27.5 MPa after 28 days. Further, the exemplary concrete 2 wherein the cement contains an additive having a higher specific surface, presents a compressive strength of 21.2 MPa after 3 days and 33.4 MPa after 28 days, thus lower than the exemplary mixture 1 containing graphene nanofibers with lower specific surface area.

In another particular embodiment between 10% and 75% by weight of the graphene nanofibers of the additive of the invention have an average specific surface area of between 250 and 450 m$^2$/g, preferably between 260 m$^2$/g and 400 m$^2$/g, preferably between 270 and 350 m$^2$/g, even more preferably between 290 and 325 m$^2$/g, even more preferably about 300 m$^2$/g. In a preferred embodiment of the latter, between 10% and 50%, more preferably between 10% and 35%, even more preferably between 15% and 35% by weight of the graphene nanofibers of the additive have an average specific surface area of between 250 and 450 m$^2$/g. In yet another embodiment, between 30 and 45% by weight of the graphene nanofibers of the additive have an average specific surface area of between 250 and 450 m$^2$/g, more preferably between 35% and 40% by weight of the graphene nanofibers. Moreover, the additive of the invention when containing between 10 and 50% by weight graphene nanofibers having an average specific surface area of between 250 and 450 m$^2$/g confer to the cement wherein it is incorporated an increase in the indirect tensile strength.

Figure 2:
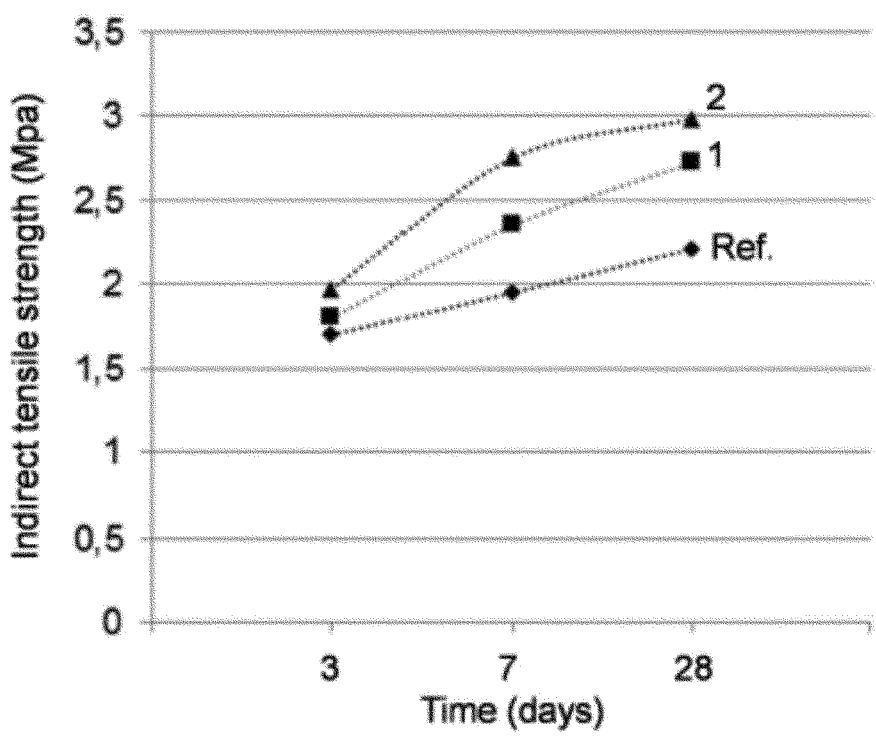
FIG. 2 shows the change of the indirect tensile strength with time of two reinforced concretes containing an additive of the invention (1 and 2) and of a reference concrete sample without the additive (Ref.).

FIG. 2 of the present invention shows the indirect tensile strength of two concretes reinforced with an additive of the invention (1 and 2) and of a reference sample without additive (Ref.). In brief, a comparative analysis between the reference concrete sample and concretes 1 and 2 is performed, wherein the only difference lies in the composition of the samples. The assay is performed using cylindrical test pieces of 150×300 mm according to UNE-EN 12390-6:2000 and consists in measuring the maximum load after which the cylindrical test piece breaks. The figure shows that concrete 2 containing the additive wherein 25% of the graphene nanofibers are fibers with specific surface area of between 250 and 450 m$^2$/g present an indirect tensile strength higher than the reference sample without additive (Ref.) and higher than a cementitious composition containing the additive of the invention wherein 25% of the graphene nanofibers present a lower specific surface area (concrete 1).

Figure 3:
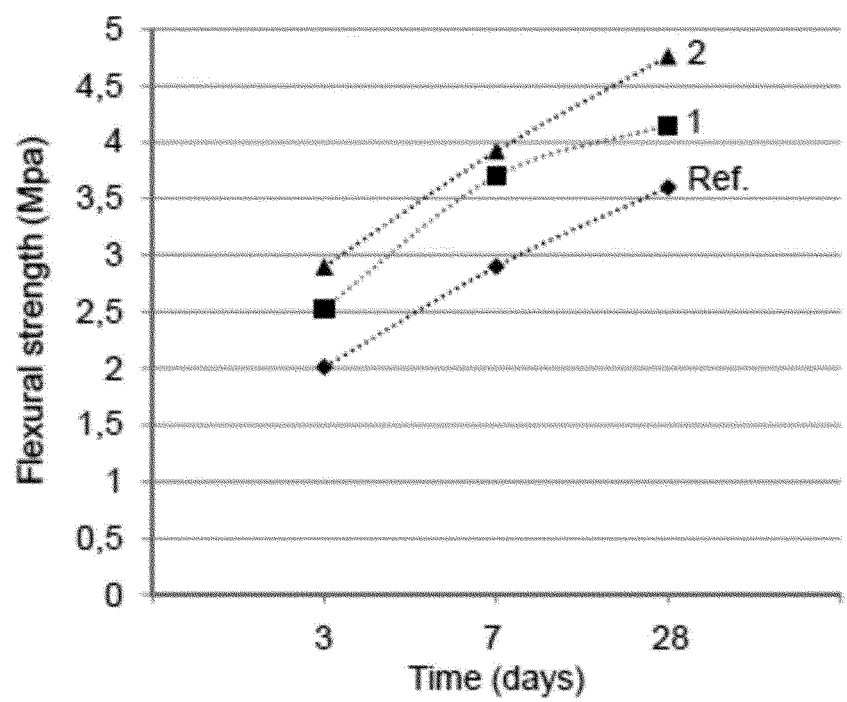
FIG. 3 shows the change of the flexural strength with time of two reinforced concretes containing an additive of the invention (1 and 2) and of a reference concrete sample without the additive (Ref.).

Likewise, FIG. 3 shows the behaviour of the three samples (Ref., mixture 1 and mixture 2) under a flexural test. This test measures the force required to bend the material under three-point loading conditions. The figure shows that concrete 2 containing the additive wherein 25% of the graphene nanofibers are fibers with specific surface area of between 250 and 450 m$^2$/g, present a higher flexural strength than mixture 1 and higher than the reference sample without additive. In particular mixture 2 presents a flexural strength of 2.9 MPa after 3 days and of 4.76 MPa after 28 days, while the reference concrete sample presents a flexural strength of 2.01 MPa after 3 days and of 3.6 MPa after 28 days.

In another particular embodiment the additive for a cementitious composition of the invention has between 50% and 90%, preferably between 70% and 80%, by weight of long length graphene nanofibers having a length of between 5 and 200 µm and a diameter between 10 nm and 100 nm. Preferably, said long length graphene nanofibers have an average specific surface area of between 30 and 100 m$^2$/g.

In another particular embodiment, the additive for a cementitious composition of the invention has between 10% and 75%, preferably between 10% and 50%, by weight of the graphene nanofibers having an average specific surface area of between 70 and 249 m$^2$/g and a length of between 20 and 2000 nm and between 50% and 90%, preferably between 70% and 80%, by weight of the graphene nanofibers having an average specific surface area of between 30 and 100 m$^2$/g and a length of between 5 and 200 µm under the condition that the sum of the percentage weights of the graphene nanofibers is not greater than 100%.

In another particular embodiment, the additive for a cementitious composition of the invention has between 10% and 75%, preferably between 10% and 50%, by weight of the graphene nanofibers having an average specific surface area of between 250 and 450 m$^2$/g and a length of between 20 nm and 2000 nm and between 50% and 90%, preferably between 70% and 80%, by weight of the graphene nanofibers having an average specific surface area of between 30 and 100 m$^2$/g and a length of between 5 and 200 µm under the condition that the sum of the percentage weights of the graphene nanofibers is not greater than 100%.

In yet another particular embodiment, the additive for a cementitious composition of the invention has between 10% and 50% by weight of the graphene nanofibers having an average specific surface area of between 70 and 249 m$^2$/g and a length of between 20 and 2000 nm, between 10% and 50% by weight of the graphene nanofibers having an average specific surface area of between 250 and 450 m$^2$/g and a length of between 20 nm and 2000 nm, and between 50% and 90% by weight of the graphene nanofibers having an average specific surface area of between 30 and 100 m$^2$/g and a length of between 5 and 200 µm under the condition that the sum of the percentage weights of the graphene nanofibers is not greater than 100%.

In a preferred example, the additive for a cementitious composition of the invention has between 15% and 30% by weight of GNF LS of the total weight of the nanofibers, between 15% and 30% by weight of GNF HS of the total weight of the nanofibers, and between 40% and 85% by weight of GNF LL of the total weight of the graphite nanofibers, under the condition that the sum of the percentage weights of the graphene nanofibers is not greater than 100%.

The additive for the cementitious composition according to the invention further contains graphene oxide.

The inventors have found that the graphene oxide in the additive of the invention improves the dispersion and stability of the additive in the cementitious composition and enhances the hydration of the cement in the cementitious composition or cementitious materials.

It is known in the art that concrete is produced by mixing cement with sand, gravel and water. However, the high amount of water required may result in an increase of the porosity of the concrete, thereby reducing the mechanical properties.

In this sense, the presence of graphene oxide (GO) together with the superplasticizer in the additive reduces the amount of water required in the production of concrete. Moreover, a reduction of the water-to-cement (w/c) ratio increases the workability of the fresh mixtures and the performances of the hardened pastes, mortars or concretes.

Figure 4:
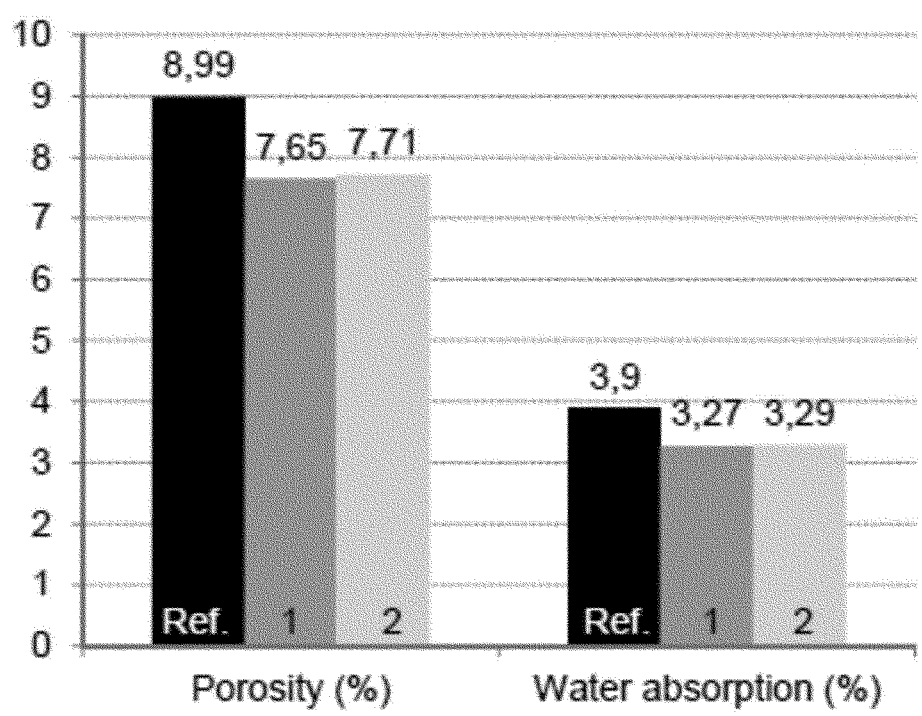
FIG. 4 shows the porosity and water absorption of two reinforced concretes containing an additive of the invention (1 and 2) and of a reference concrete sample without the additive (Ref.)

FIG. 4 shows the porosity and water adsorption of concretes reinforced with the additive of the invention containing graphene oxide (Concrete 1 and Concrete 2) and of a non-reinforced reference concrete. The figure shows that the porosity and the absorption of water are lower in the concretes reinforced with the additive of the invention.

GO suitable for the additive of the invention can be easily obtained from methods known in the art such as by treating graphite under strong oxidative conditions, such as in a mixture of sulphuric acid, sodium nitrate and potassium permanganate, and subsequent exfoliation [Zhu et al., Adv. Mater., 22(35)(2010)3906-3924]. Moreover, GO suitable for the additive of the invention can be also acquired in the market.

In a preferred embodiment the graphene oxide of the additive of the present invention is in the form of powder or flakes having an average diameter of between 10 and 1000 µm, preferably between 15 and 800 µm, preferably between 20 and 600 µm, preferably between 30 and 500 µm, preferably between 50 and 200 µm, preferably between 80 and 150 µm, even more preferably between 100 and 120 µm. In another preferred embodiment, 90% of the particles forming the graphene oxide have an average diameter comprised between 30 and 500 µm, 50% between 30 and 200 µm, and 10% of the particles have an average diameter comprised between 30 and 50 µm.

In another embodiment of the invention the GO has an average specific surface area of between 200 and 600 m$^2$/g, preferably between 300 m$^2$/g and 500 m$^2$/g, preferably between 350 and 450 m$^2$/g, even more preferably between 390 and 425 m$^2$/g, even more preferably about 400 m$^2$/g.

The relative amounts of the graphene nanofibers and GO is preferably in the range of mass ratios of GO to GNFs of 0.1-0.5.

The presence of GNFs (of two or three types) and GO in different proportions according to requirements allows the appearance of excellent reinforcing capabilities in terms of both compressive strength and flexural strength.

The GNFs/GO mass ratio plays a role in the efficiency of filling the pores of the cement material because of their small size, resulting in a lower porosity of the final material.

The additive of the present invention further contains a superplasticizer.

The inventors have found that the additive of the present invention comprising the superplasticizer significantly reduces the necessary content of water in the cementitious composition.

In a preferred embodiment the superplasticizer is a polycarboxylate ether-based superplasticizer (PCEs) or a sulfonated superplasticizer. PCEs are composed by a methoxy-polyethylene glycol copolymer (side chain) grafted with methacrylic acidcopolymer (main chain).

Examples of sulfonated superplasticizers suitable for formulating the additive of the present invention include lignosulfonates, naphtalensulfonates and melamine sulfonate formaldehyde condensates.

The inventors have found that the hydroxyl or carbonyl groups of the lateral chains of the superplasticizer molecules act as binding points interacting with the graphene nanofibers and with the cement.

Ultrasonic energy may be used to disperse the material comprising graphene nanofibers and graphene oxide in the acrylic solvent of the additive of the invention. In a preferred embodiment, ultrasounds are applied to the dispersion for a time comprised between 1 and 4 hours. Preferably, one cycle of ultrasounds is applied with amplitude of 30%.

In a preferred embodiment, an ultrasounds bath is next applied to the resulting dispersion for a time comprised between 2 and 24 h., preferably for a time comprised between 8 and 12 h. More preferably, an ultrasounds bath is applied to the resulting dispersion for a time of about 8 h.

Figure 7:
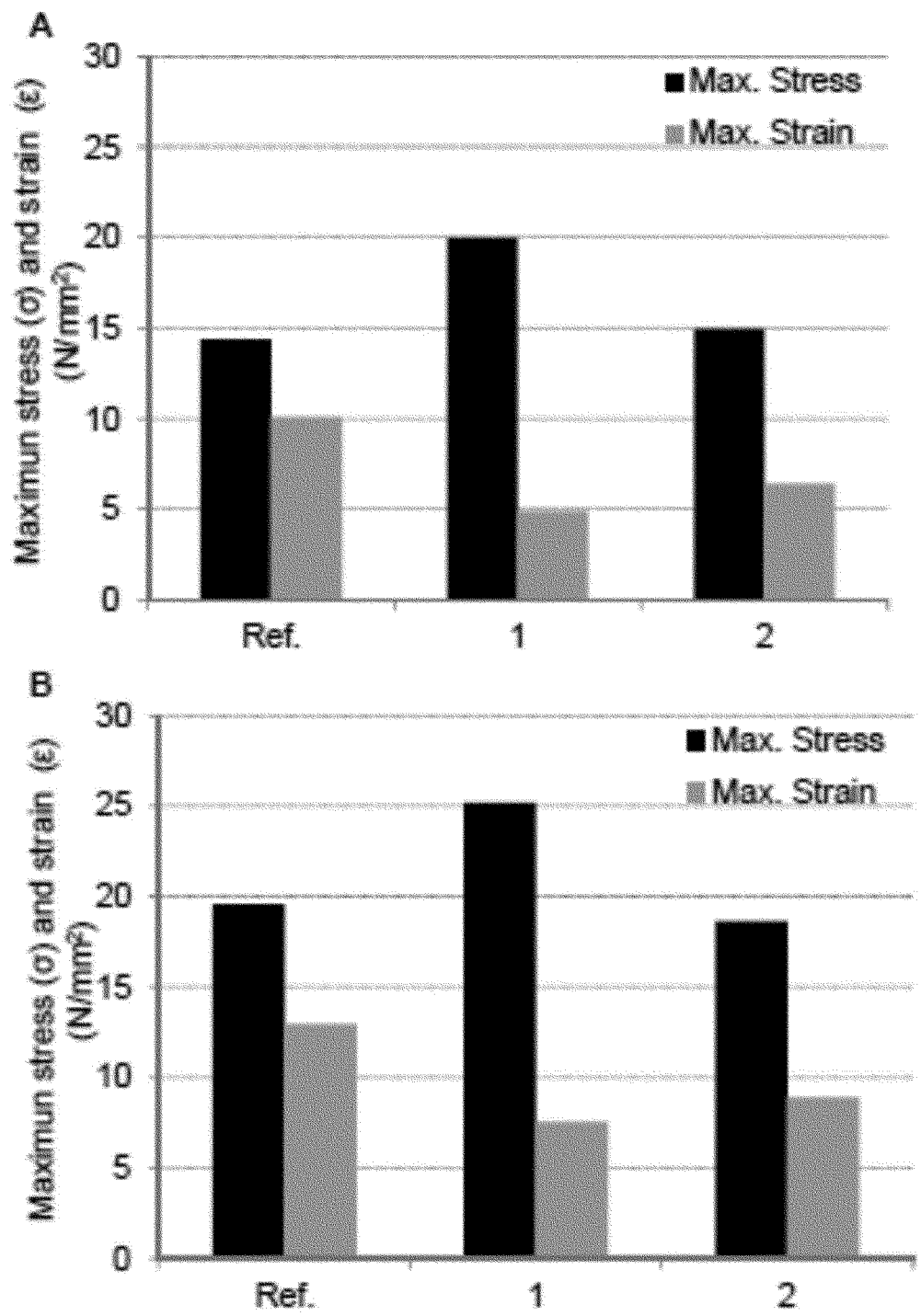
FIG. 7 shows the maximum stress (a) and Maximum strain (c) values for two reinforced concretes containing an additive of the invention (Concrete 1 and 2) and for a reference concrete sample without the additive (Reference concrete) without (A) and with (B) with regard to the exposure to fire.

In one aspect the present invention provides a cementitious composition comprising cement and the additive of the invention. The additive of the invention confers to the cementitious composition advantageous properties, such as improved mechanical properties of tensile strength and compression as well as of the resistance to fire. In this sense FIGS. 1-3 evidence the improvement of the mechanical properties of two cement samples reinforced with the additive of the invention with respect to a reference sample without additive. Moreover, FIG. 7 evidences the improvement in the resistance to fire of the cements reinforced with the additive of the invention.

Figure 5:
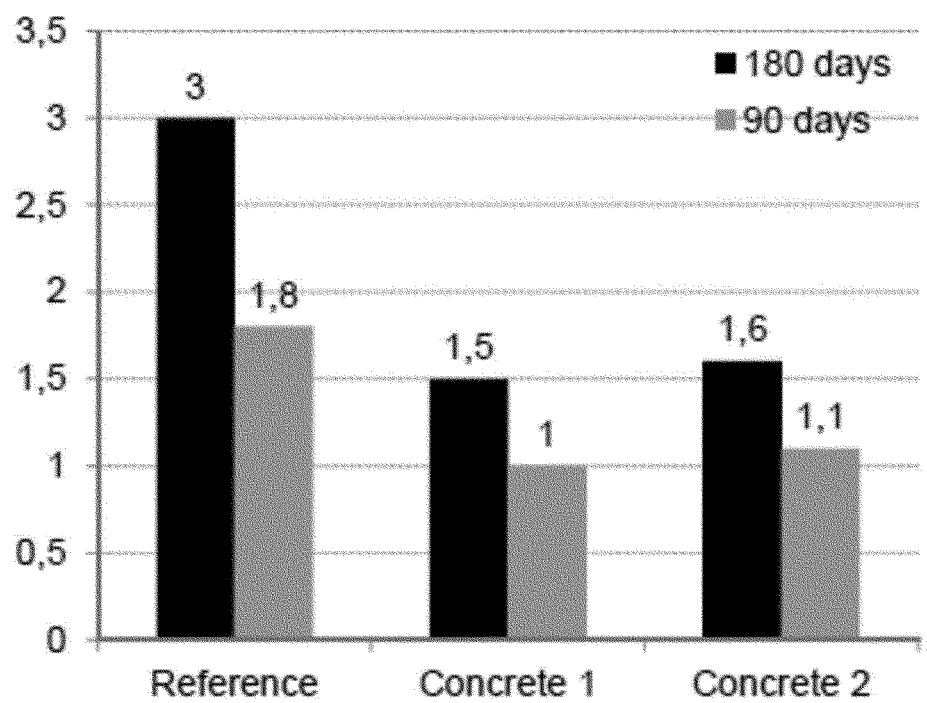
FIG. 5 shows the carbonation depth of two reinforced concretes containing an additive of the invention (Cement 1 and Cement 2) and of a reference concrete sample without the additive (Reference).

In addition, FIG. 5 shows that the carbonation depth of a cementitious composition reinforced with an additive of the invention (concrete 1 and 2) is lower than the carbonation depth of a reference sample without additive.

A cementitious composition can also include ground granulated blast furnace slag (GGBFS), some forms of fly ash, such as class C fly ash, ground limestone and silica fume. Such cementitious agents may be used in compositions of the invention either individually or in combination. Moreover, the cementitious composition may further comprise silica nanoparticles and/or cellulose.

In some embodiments, the cementitious composition further comprises one or more aggregates. Aggregates are mostly chemically inert, solid bodies held together by the cement or hardened cement paste or hardened mortar. Aggregates come in various shapes, sizes, and materials ranging from fine particles, such as sand, to large particles, such coarse rocks. Other aggregates include river gravel, land gravel, pit gravel, crushed stone, vermiculite, ceramic spheres, perlite, expanded clay, shale, slate, crushed brick, crushed limestone, sand, river gravel, crushed recycled concrete, steel shot, iron shot, steel pellets, and iron pellets.

The selection of an aggregate is determined, in part, by the desired characteristics of the cement mix. For example, the density of concrete is influenced by the density of the aggregate. Soft, porous aggregates can result in weak concrete with low wear resistance, while using hard aggregates can make strong concrete with a high resistance to abrasion. The aggregates are usually washed to remove any dust, silt, clay, organic matter, or other impurities that would interfere with the bonding reaction with the cement paste.

In the concrete composition, an air entraining admixture may be added, if necessary, for gaining an appropriate content of air for rendering the concrete durable. Suitable admixtures include anionic surfactants, cationic surfactants, nonionic surfactants, and amphoteric surfactants. Exemplary of the anionic surfactant are carboxylic acid, sulfuric acid ester, sulfonic acid, and phosphoric acid ester type surfactants. Exemplary of the cationic surfactant are amine salt, primary amine salt, secondary amine salt, tertiary amine salt, and quaternary amine salt type surfactants. Exemplary of the nonionic surfactant are ester, ester-ether, and ether type surfactants. Exemplary of the amphoteric surfactant are amino acid and sulfo-betaine type surfactants.

In the concrete composition, a defoamer may be used, if necessary, for preventing an excessive amount of air entrained upon mixing from acting to reduce strength. Suitable defoamers include oxyalkylene, silicone, alcohol, mineral oil, fatty acid, and fatty acid ester base defoamers.

In the concrete composition, a set accelerator such as calcium chloride, lithium chloride or calcium formate, or a set retarder such as sodium citrate or sodium gluconate may be added to the concrete composition.

Also, an expanding agent may be added to the concrete composition, if necessary, for preventing shrinkage crazing on curing and drying, and for preventing crazing concomitant with thermal stresses by the hydration heat of cement. Suitable expanding agents include lime base agents.

Other agents that may be added to the concrete composition include solid particles or powders, such as of electrically conductive material such as manganese oxide, tin oxide, titanium oxide and/or nickel oxide, or semi-conductive material including semiconducting nanoparticles such as CdS, PdS, CdSe, or resistive material, magnetically active material, ceramics, metals including metal nanoparticles such as. Pt, Pd, Au, Ag, Sn, glass beads or fibers, pH buffers, salts, and any mixture of one or more of these.

In a particular embodiment the cementitious composition contains the additive of the invention wherein the total amount of graphene nanofibers and graphene oxide is between 0.0002% and 0.002% by weight with respect to the cement weight. In a preferred embodiment the total amount of graphene nanofibers and graphene oxide is between 0.0005% and 0.0015% by weight, preferably 0.0008% and 0.0012% by weight with respect to the cement weight.

In another particular embodiment the cementitious composition contains about 0.0002% of graphene nanofibers GNF HS of specific surface area of between 250 and 400 $m^2/g$ and a length of between 0.02 and 2 μm, about 0.0006% of graphene nanofibers GNF LL having a length of between 5 and 200 μm and a specific surface area of between 30 and 100 $m^2/g$, about 0.0002% of graphene oxide and about 1% of superplasticizer by weight with respect to the cement weight.

The amount of dispersant agent (D) of the invention additive by weight is of about 1% on the total weight of GNFs+GO.

Other aspect of the invention refers to a cement paste comprising the cementitious composition of the invention. The cement paste is prepared by blending the cementitious composition of the invention comprising cement and the additive and water.

In another aspect the invention relates to a process for preparing a reinforced concrete comprising mixing the cement paste including the additive of the invention with water, sand and gravel. As it is known by the person skilled in the art the reinforced concrete is produced by curing the resulting mixture comprising the cement paste, sand, gravel and water over time, at room temperature. Thus, other aspect of the invention refers to the reinforced concrete obtainable by the former process comprising mixing the cement paste including the additive of the invention with water, sand and gravel.

The reinforced concrete pursuant to the use of the additive of the invention will find wide application for highway structures, bridges, pavements, runways for airports, continuous slab type sleepers for high speed trains, dam walls, retaining walls, railway sleepers, pipes, precast elements such as for commercial and residential buildings, cladding, mortar, render, marine and aquatic structures and the like and in general in all applications of conventional and high strength concrete, as well as in manufactured precast elements for residential and commercial buildings. Due to its conductive properties, concrete slabs according to the invention can have a wide range of applications, such as induction material to allow electric charge of transport vehicles. Thus, one aspect of the invention refers to the use of the reinforced concrete for highway structures, bridges, pavements, runways for airports, continuous slab-type sleepers for high speed trains, covers of crates, and in manufactured precast elements for residential and commercial buildings.

EXAMPLES

Example 1: Additive 1

A first solution was prepared by dispersing 0.5 g of graphene oxide (GO) in 1 kg of superplasticiser (SP) based on polycarboxylate ether. The resulting dispersion was sonicated for 2 hours in a resonance cycle of 30% amplitude.

A second solution was prepared by dispersing 0.5 g of graphene nanofibers of low specific surface area ($\approx$115 $m^2/g$, with a length of from 20 to 2000 nm and of a diameter comprised between 5-160 nm, GNF LS), with 1.5 g of graphene nanofibers having a length between 20 μm and 200 μm (30 to 100 $m^2/g$ and diameter comprised between 2-200 nm, GNF LL) and 0.025 g of dispersing agent (D) (Alcosperse 747) and all this in 1.5 kg of superplasticiser (polycarboxylate ether based superplasticiser). The resulting dispersion was sonicated for 2 hours having 30% amplitude.

The first and the second solution were mixed, and the resulting solution placed in an ultrasound bath for 24 hours to form additive 1.

The weight ratios of the components of the additive in the cementitious composition are the following:
GNF LS: 0.0002% by weight of cement
GNF LL: 0.0006% by weight of cement
GO: 0.0002% by weight of cement
Dispersing agent (D): Alcosperse 747: 1% by weight of the total sum of graphene nanofibers GNFs+GO
Superplasticizer (SP): 1% of the weight of the cement distributed between the two solutions that make up additive A concrete sample (1 $m^3$) was prepared. The additive 1 (2.5 Kg) was mixed with 250 kg of cement, 167.5 L of water, 880 kg of gravel and 1104 kg of sand following the steps of:
Mix 80% of the water of the mixture with 100% of the cement in the mixture;
Add gravel and sand and mix for 3-4 min;
Add the 2.5 kg of additive 1 together with 20% of the remaining water to the mixed sample;
Allow to mix for 10 minutes;
Samples for measurement was obtained after pouring ⅓ of the total concrete mixture. By first removing and discarding the first ⅓ m3. This ensures that the sample is representative of the whole mix.

The resultant cement paste was cast in moulds and cured. Curing was accomplished by allowing the cement paste specimens to moist cure over time, at 23±2° C., to produce Concrete 1.

Example 2: Additive 2

Additive 2 was prepared following the same procedure as for additive 1 but replacing the graphene nanofibers of low specific surface area (GNF LS) by graphene nanofibers of high specific surface area ($\approx$400 $m^2/g$, with a length of from 20 to 2000 nm and of a diameter comprised between 5-160 nm, GNF HS).

The weight ratios of the components of the additive in the cement are the following:
GNF HS: 0.0002% by weight of cement
GNF LL: 0.0006% by weight of cement
GO: 0.0002% by weight of cement
Dispersant agent (D): Alcosperse 747: 1% by weight of the total sum of graphene nanofibers GNF's+GO
Superplasticizer (SP): 1% of the weight of the cement distributed between the two solutions that make up additive A concrete sample (1 $m^3$) was prepared. The additive 1 (2.5 Kg) was mixed with 250 kg of cement, 167.5 L of water, 880 kg of gravel and 1104 kg of sand following the steps of:
Mix 80% of the water of the mixture with 100% of the cement in the mixture;
Add gravel and sand and mix for 3-4 min;
Add the 2.5 kg of additive 1 together with 20% of the remaining water to the mixed sample;
Allow to mix for 10 minutes;
Samples for measurement were obtained after pouring ⅓ of the total concrete mixture. By first removing and discarding the first ⅓ m3. This ensures that the sample is representative of the whole mix.

The resultant cement paste was cast in moulds and cured. Curing was accomplished by allowing the cement paste specimens to moist cure over time, at 23±2° C., to produce Concrete 2.

Comparative Example 3

A comparative mixture was prepared by mixing 250 kg of cement, 190 L of water, 880 kg of gravel and 1104 kg of sand following the same steps as for additive 1 but in this case, no additive was added (additive 1 and 2 of the two previous examples) to this mixture and a commercial superplasticising additive was added.

The resultant cement paste was cast in moulds and cured. Curing was accomplished by allowing the cement paste specimens to moist cure over time, at 23±2° C., to produce a reference concrete without the additive of the invention and therefore with a commercial additive.

Mechanical Properties

The mechanical properties of concrete 1, concrete 2 and reference concrete were tested.

Compressive Strength

The compressive strength of concrete 1, concrete 2 and reference concrete was measured on cylindrical test pieces of 150×300 mm in a compacting machine C.M.E. 2500 KN according to UNE-EN 12350-2:2009 applying 25 strokes per layer. The results were collected in FIG. 1. The collected results show that the compressive strength of reinforced concretes 1 and 2 is higher than that of the reference concrete without additive. Moreover, the compressive strength is higher for concrete 1 having graphene nanofibers of low specific surface.

Indirect Tensile Strength

The indirect tensile strength of concretes 1, 2 and reference concrete was measured on cylindrical test pieces of 150×300 mm according to UNE-EN 12390-6:2000. The results are collected in FIG. 2. The collected data show that the reference concrete exhibit lower indirect tensile strength than concrete 1 and concrete 2. Moreover, concrete 2 showed higher indirect tensile strength than concrete 1.

Flexural Strength

The flexural strength of concrete 1, concrete 2 and reference concrete was measured with a prismatic indentor having a probe of 100×100×400 mm according to UNE-EN 12390-5.

The results are collected in FIG. 3. The figure shows that concrete 2 presents a higher flexural strength than concrete 1 and higher than the reference concrete.

Porosity

The porosity of the reinforced concrete obtained was measured on cylindrical test pieces of 150×300 mm according to S/ASTM C 642. FIG. 4 collects the results from concrete 1, concrete 2 and the reference concrete. The porosity of concretes 1 and 2 improves 15% in comparison with the reference concrete without additive. Water absorption percentages provide further evidence of the effect the additives of the invention have on concrete samples.

The table below shows the density values obtained according to the Active Standard ASTM C6452 Standard Test Method for Density, Absorption, and Voids in Hardened Concrete for the Reference concrete and concrete 1 and 2 samples.

|  | Ref: without additive | Concrete 1 | Concrete 2 |
| --- | --- | --- | --- |
| Real density (kg/m3) | 2550 | 2531 | 2531 |
| Apparent density | 2322 | 2336 | 2336 |

Carbonation of the Reinforced Concrete

Carbonation of the reinforced concrete obtained was measured on cylindrical test pieces of 100×150 mm according to S/UNE 112011:2011. FIG. 5 shows the results of the carbonation test under air conditions.

The carbonation depth of the reference concrete without additive is higher than that for Concrete 1 and Concrete 2, evidencing the high resistance of the concretes of the invention to carbonation.

Resistance to Chlorides

The resistance of concretes 1, 2 and the reference concrete to the ion chlorides was measured on cylindrical test pieces of 100×150 mm according to S/UNE 14629:2007.

Figure 6:
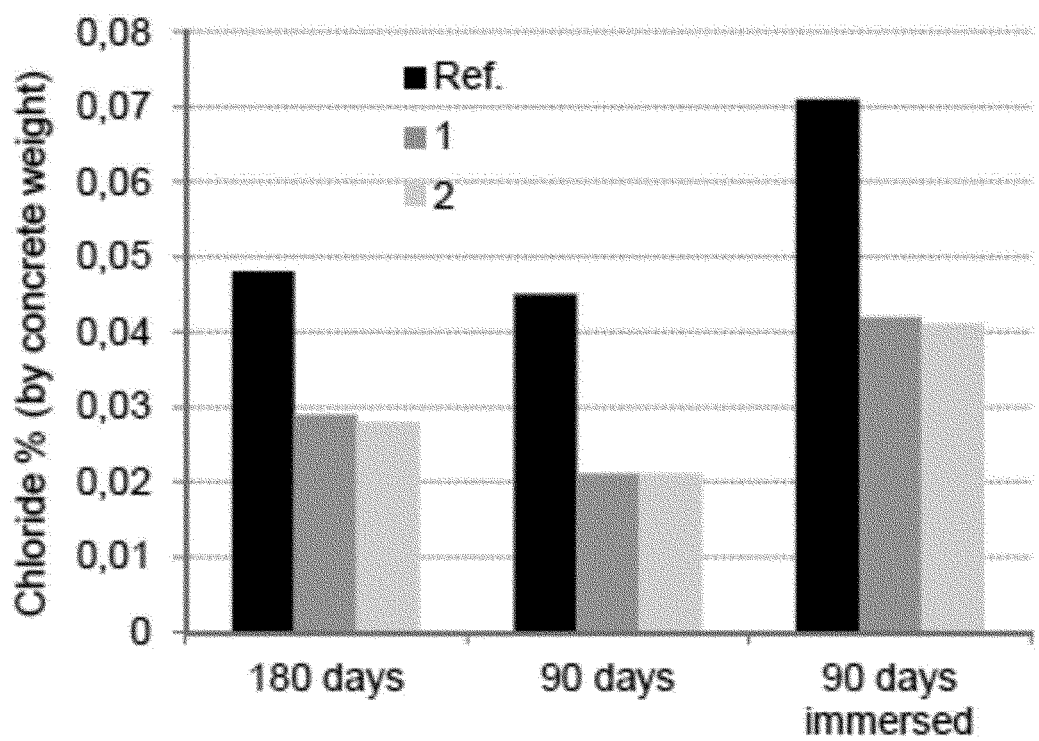
FIG. 6 shows the resistance to chlorides of two reinforced concretes containing an additive of the invention and of a reference sample without the additive.

The obtained results are collected in the following table and shown in FIG. 6.

| | % Chlorides (by concrete weight) | | |
| --- | --- | --- | --- |
| | 180 days | 90 days | 90 days immersed |
| Ref. concrete | 0.04 | 0.04 | 0.07 |
| Concrete 1 | 0.02 | 0.02 | 0.04 |
| Concrete 2 | 0.02 | 0.02 | 0.04 |

| | Sample | Maximum stress ($\sigma$) (N/mm$^2$) | Maximum strain ($\varepsilon$) (N/mm$^2$) |
| --- | --- | --- | --- |
| Without fire | Reference concrete | 14.372 | 10.063 |
| | Concrete 1 | 19.982 | 4.875 |
| | Concrete 2 | 14.943 | 6.382 |
| Exposed to fire | Reference concrete | 19.556 | 12.938 |

Carbonation of the Reinforced Concrete

Carbonation of the reinforced concrete obtained was measured on cylindrical test pieces of 100×150 mm according to S/UNE 112011:2011. FIG. 5 shows the results of the carbonation test under air conditions.

The carbonation depth of the reference concrete without additive is higher than that for Concrete 1 and Concrete 2, evidencing the high resistance of the concretes of the invention to carbonation.

The concretes of the invention present a higher resistance to chlorides than the reference sample without additives.

Fire Resistance

The fire resistance of concretes 1 and 2 and of the reference concrete sample was measured according to UNE-EN 1363-1:2012, UNE-EN 1363-2:2000 and UNE-EN1365-4:2000. The following table summarizes the averaged values (resulting from 4 essays each) obtained for the compressive strength of samples exposed or not to fire.

The teaching of the invention can be applied to several other examples, without departing from the principles of invention.

For example, example 1 could be implemented instead of with only two different classes of graphene nanofibers, with three classes i.e. with LS, HS and LL graphene nanofibers.

The WEIGHTS of these different graphene nanofibers are:

GNF LS: 0.5 gr,
GNF HS 0.5 gr,
GNF LL 1.5 gr,
with 0.5 gr of GO.

The percentages of the weight of the additive components in the cementitious composition are as follows:

GNF LS: 0.0002% by weight of cement
GNF HS: 0.0002% by weight of cement
GNF LL: 0.0006% by weight of cement
GO: 0.0002% by weight of cement
Dispersing agent (D): Alcosperse 747: 1% by weight of the total sum of graphene nanofibers GNFs+GO
Superplasticizer (SP): 1% of the weight of the cement distributed between the two solutions that make up additive For the other example, example 1 could be implemented instead of with only two different classes of graphene nanofibers, with three classes i.e. with LS, HS and LL graphene nanofibers.

The WEIGHTS of these different graphene nanofibers are:

GNF LS: 0.4 gr,
GNF HS 0.4 gr,
GNF LL 1.5 gr,
with 0.5 gr of GO,

The percentages of the weight of the additive components in the cementitious composition are as follows:

GNF LS: 0.00016% by weight of cement
GNF HS: 0.00016% by weight of cement
GNF LL: 0.0006% by weight of cement
GO: 0.0002% by weight of cement

The invention claimed is:

1. A cementitious composition comprising cement and an additive of graphene nanomaterials, the additive including a mixture of graphene nanofibers, graphene oxide (GO), a dispersing agent (D) and a superplasticizer (SP), wherein said mixture comprises at least two different graphene nanofibers, selected among:
  graphene nanofibers of high specific surface area (GNF-HS), in an amount of between 10% and 75% by weight with respect to the additive, having an area comprised between 260 to 400 m$^2$/g and length of 0.02 to 2 μm;
  graphene nanofibers of low specific surface area (GNF-LS), having an area comprised between 70 to 249 m$^2$/g and length of 0.02 to 2 μm; or graphene nanofibers of long length (GNF-LL), with a specific surface area comprised between 30 to 100 m²/g and a length of 5 to 200 μm, wherein the superplasticizer (SP) is a polycarboxylate ether-based superplasticizer (PCEs) or a sulfonated superplasticizer, wherein the amount of dispersing agent (D) of the additive is of about 1% on the total weight of the graphene nanofibers and graphene oxide, wherein the graphene nanofibers have an average diameter comprised between 2 nm and 200 nm, and wherein the additive contains a total amount of graphene nanofibers and graphene oxide of between 0.0002% and 0.002% by weight with respect to the weight of the cement in the cementitious composition.

2. The cementitious composition of claim 1, wherein the mixture of graphene nanofibers comprises three graphene nanofibers including the graphene nanofibers of high specific surface area (GNF-HS), the graphene nanofibers of low specific surface area (GNF-LS), and the graphene nanofibers of long length (GNF-LL).

3. The cementitious composition of claim 1, wherein the mixture of graphene nanofibers comprises at least two different graphene nanofibers, selected among:

between 10% and 50% by weight of the graphene nanofibers of low specific surface area (GNF-LS), between 10% and 50% by weight of the graphene nanofibers of high specific surface area (GNF-HS), and between 50% and 90% by weight of the graphene nanofibers with a specific surface area (GNF-LL), under the condition that the total sum of the percentage weights of the graphene nanofibers is not greater than 100%.

4. The cementitious composition of claim 1, wherein the graphene oxide is in the form of powder or flakes having an average diameter of between 10 and 1000 μm.

5. The cementitious composition of claim 1, wherein the graphene oxide is in the form of powder or flakes having an average diameter of between 15 and 800 μm.

6. The cementitious composition of claim 1, wherein the superplasticizer is present in an amount of between 1% and 2% by weight with respect to the weight of the cement in the cementitious composition.

7. A process for preparing a reinforced concrete comprising mixing a cementitious composition according to claim 1 with water, sand, and gravel.

8. A reinforced concrete comprising the cementitious composition of claim 1 in combination with water, sand, and gravel.

* * * * *